Figure 1:
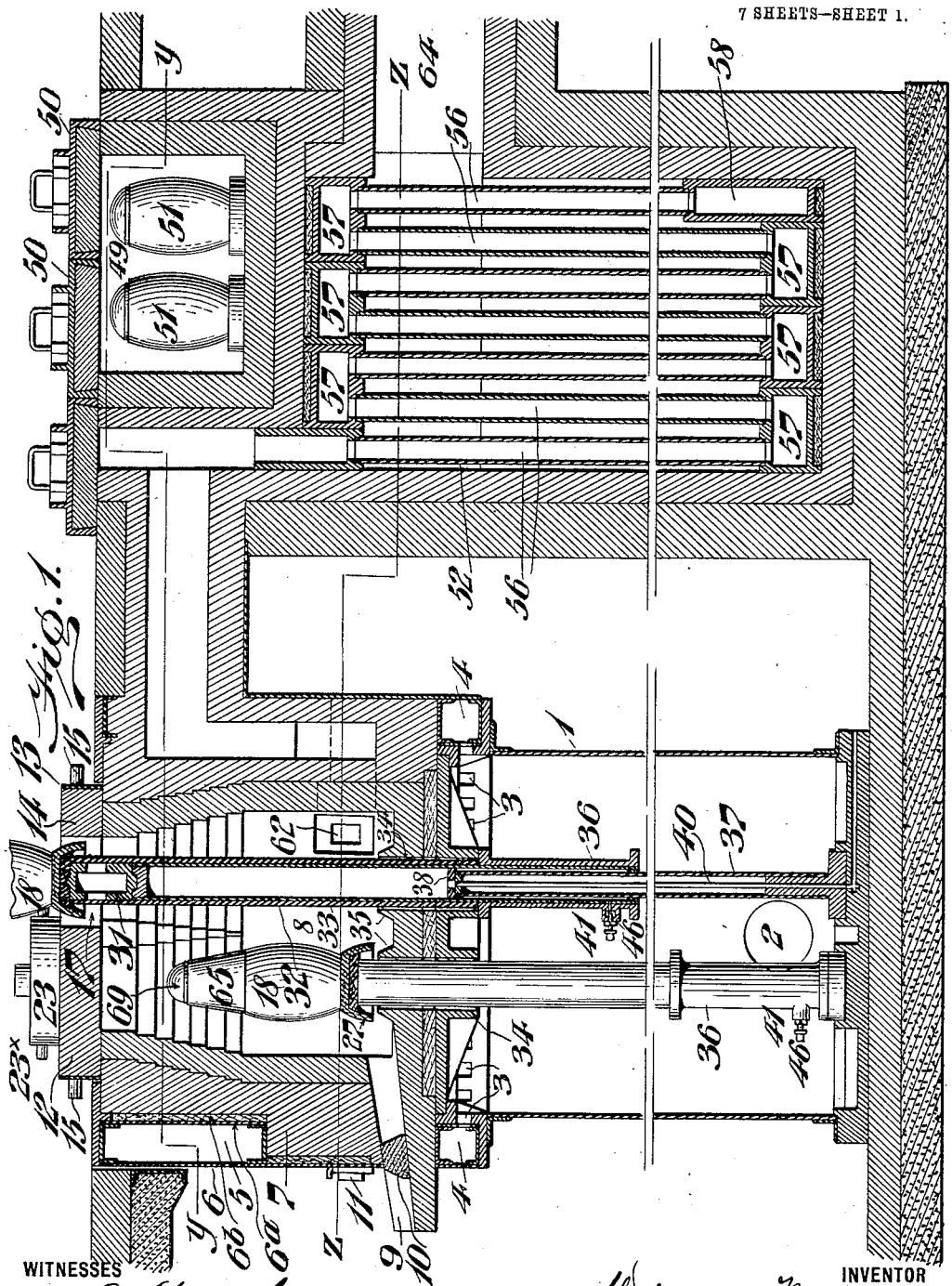

W. MELAS.
CRUCIBLE MELTING FURNACE.
APPLICATION FILED SEPT. 8, 1911.

1,086,835.

Patented Feb. 10, 1914.

7 SHEETS—SHEET 1.

W. MELAS.
CRUCIBLE MELTING FURNACE.
APPLICATION FILED SEPT. 8, 1911.

1,086,835.

Patented Feb. 10, 1914.
7 SHEETS—SHEET 6.

WITNESSES

INVENTOR
William Melas
BY Wiedersheim + Fairbanks,
ATTORNEYS

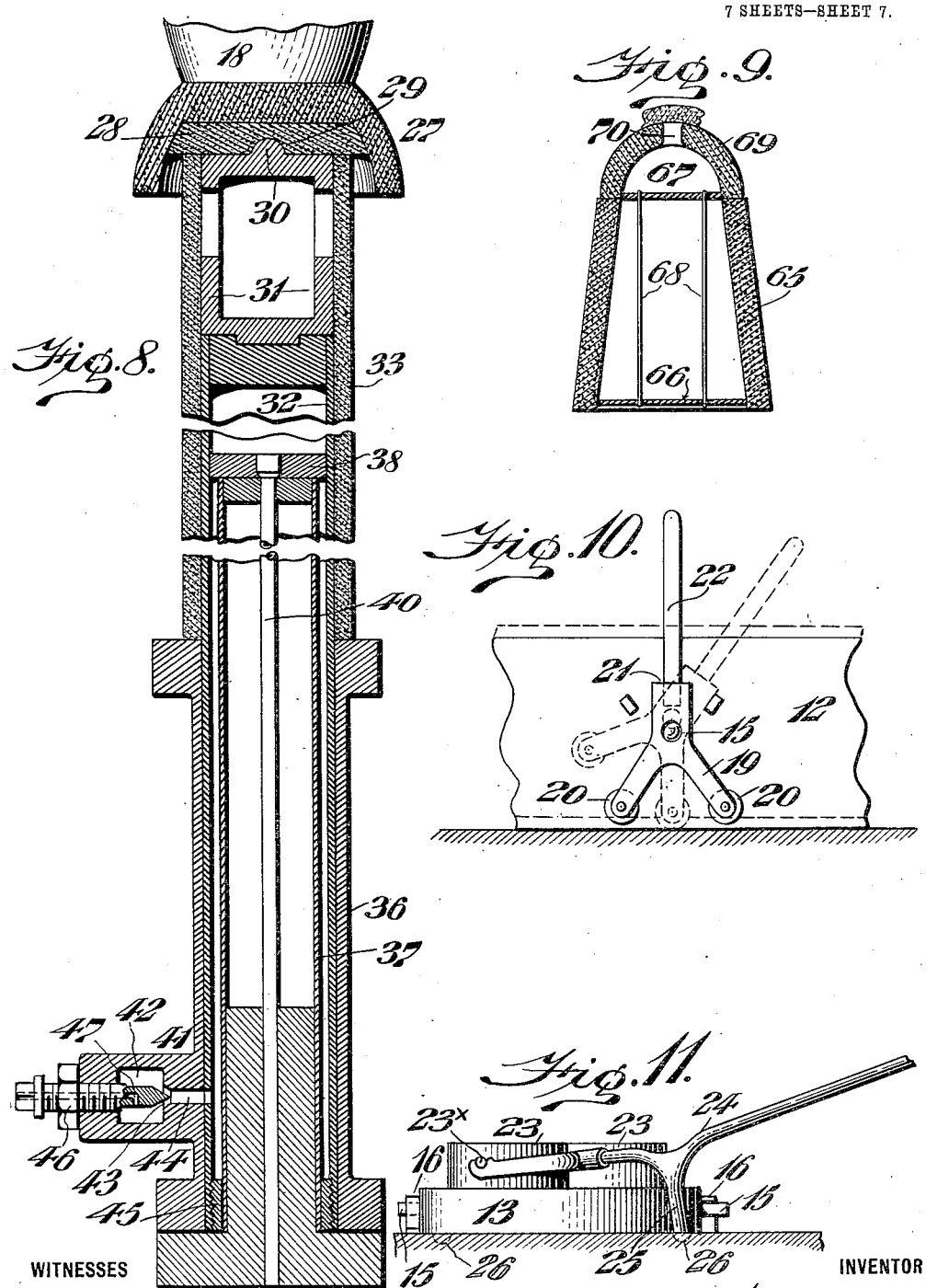

UNITED STATES PATENT OFFICE.

WILLIAM MELAS, OF PHILADELPHIA, PENNSYLVANIA, ASSIGNOR OF ONE-HALF TO DAVID TOWNSEND, OF PHILADELPHIA, PENNSYLVANIA.

CRUCIBLE MELTING-FURNACE.

1,086,835. Specification of Letters Patent. Patented Feb. 10, 1914.

Application filed September 8, 1911. Serial No. 648,337.

*To all whom it may concern:*

Be it known that I, WILLIAM MELAS, a citizen of the United States, residing in the city and county of Philadelphia, State of Pennsylvania, have invented a new and useful Crucible Melting-Furnace, of which the following is a specification.

My invention relates to furnaces for melting metals, such as steel, in crucibles, and it consists of such furnace employing a gaseous or liquid fuel such as oil or other liquid hydro-carbon.

It further consists of such a furnace in which all air admitted into its combustion chamber is under positive control and in which undue escape of heat from such chamber is prevented or checked.

It further consists of such a furnace in which the products of combustion or waste gases are conveyed from the melting furnace or crucible chamber to a preheating chamber to there preheat charged crucibles before they are placed in said former furnace.

It further consists of such a furnace in which air is heated from the walls of the furnace or combustion chamber, to provide hot air for the liquid fuel burners.

It further consists of such a furnace in which combustion air is heated in a stove by means of the products of combustion or waste gases after the latter have heated the crucibles in the preheating chamber and before they escape from the furnace through a flue.

It further consists of such furnace in which the combustion chamber for the melting crucibles is heated by fluid fuel burners and combustion air is heated by the heat from such chamber and from the waste gases from said chamber after such gases have preheated charged crucibles It further consists of improved means for removing the crucibles from the combustion chamber.

It further consists of improved means for retaining the heat in the combustion chamber when removing the crucibles of molten metal.

It further consists of improved means for operating the covers of the combustion chamber.

It further consists of other novel features of construction all as will be hereinafter fully set forth.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 2:
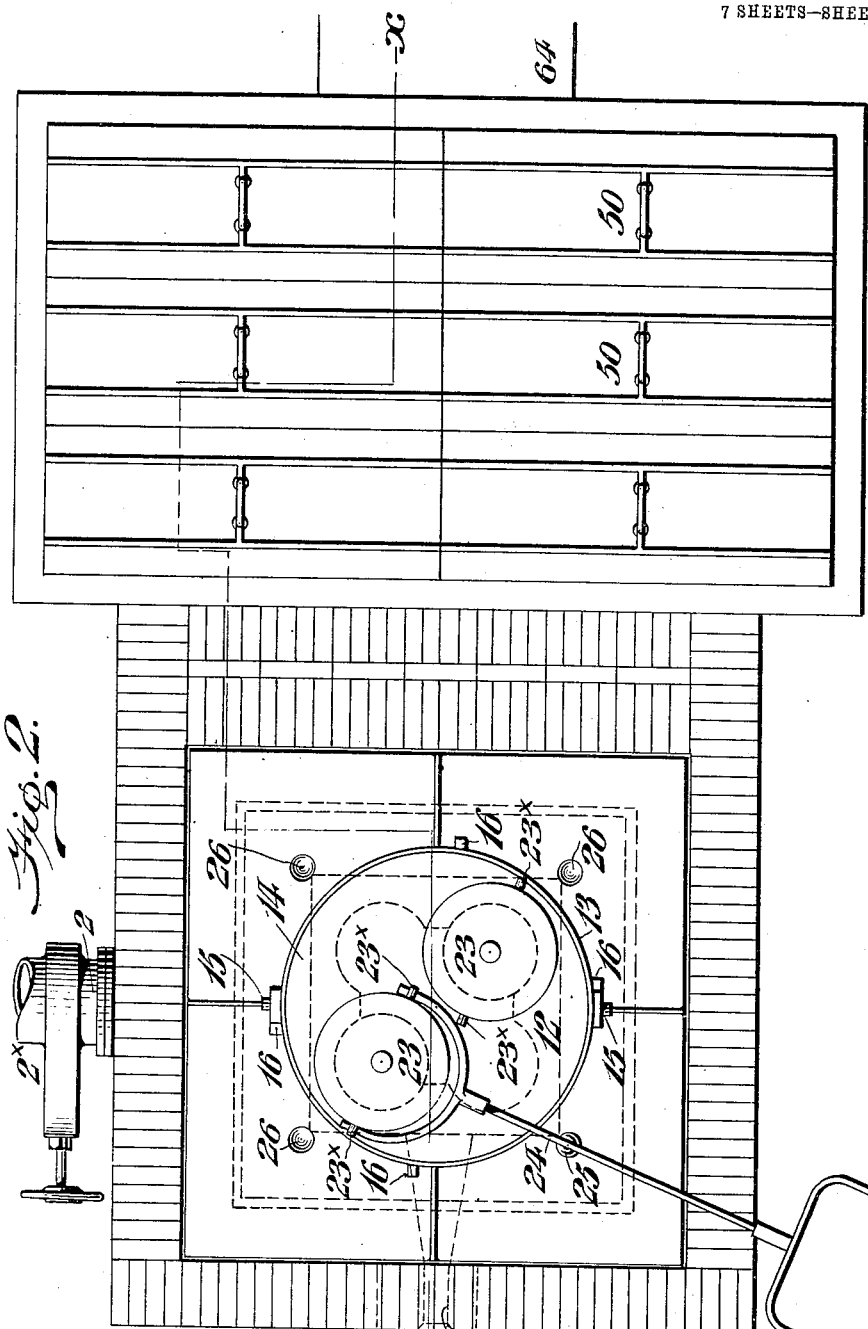
Figure 3:
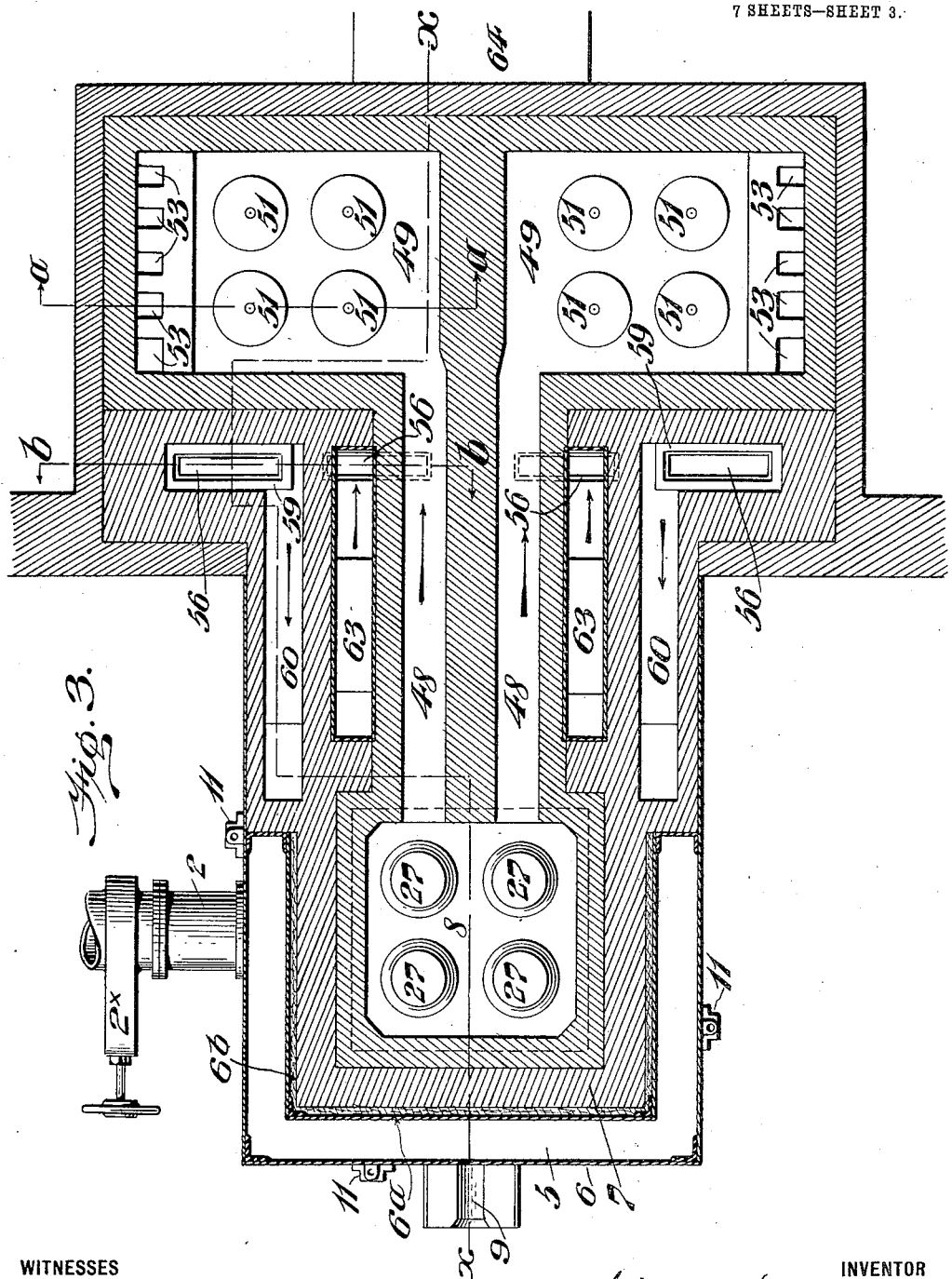
Figure 4:
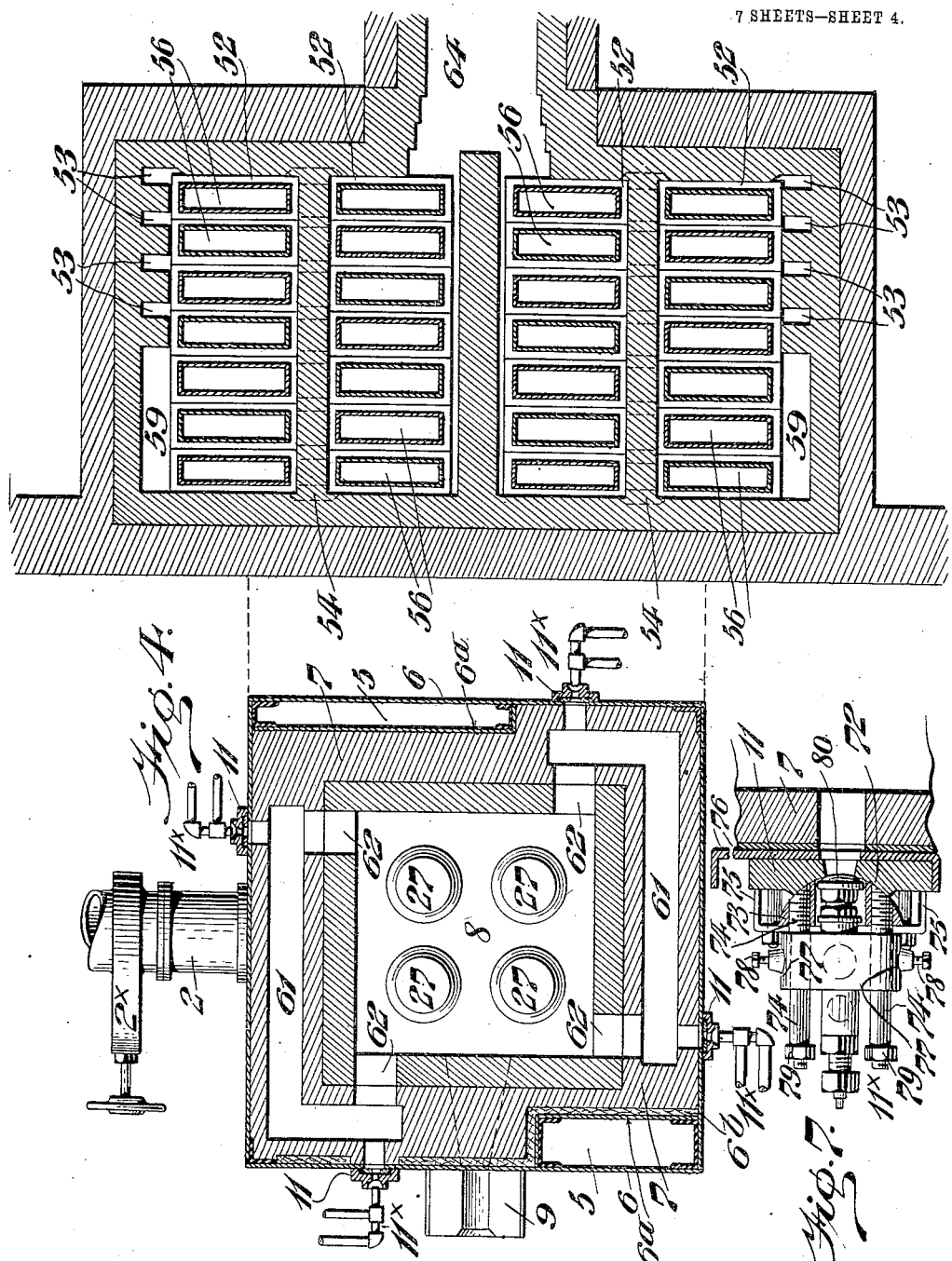
Figure 5:
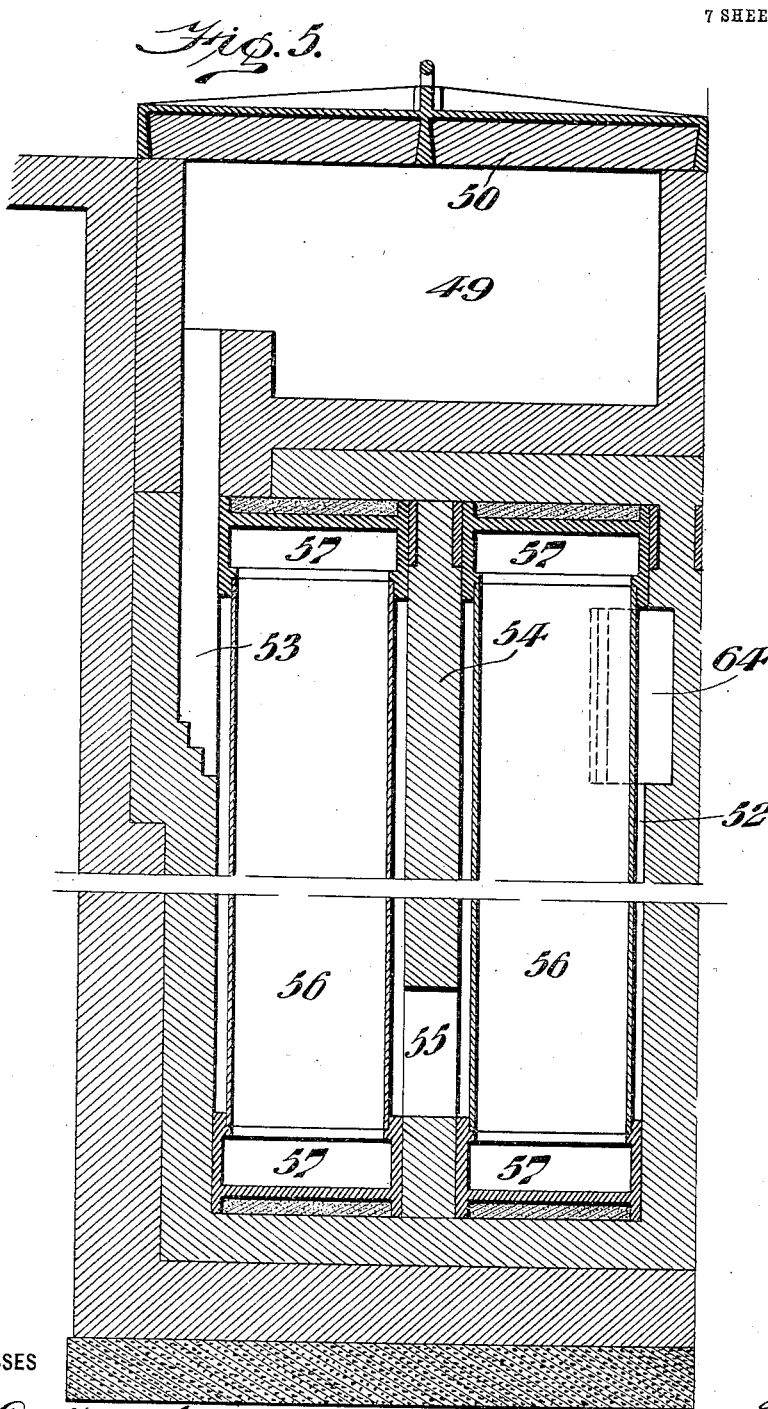
Figure 6:
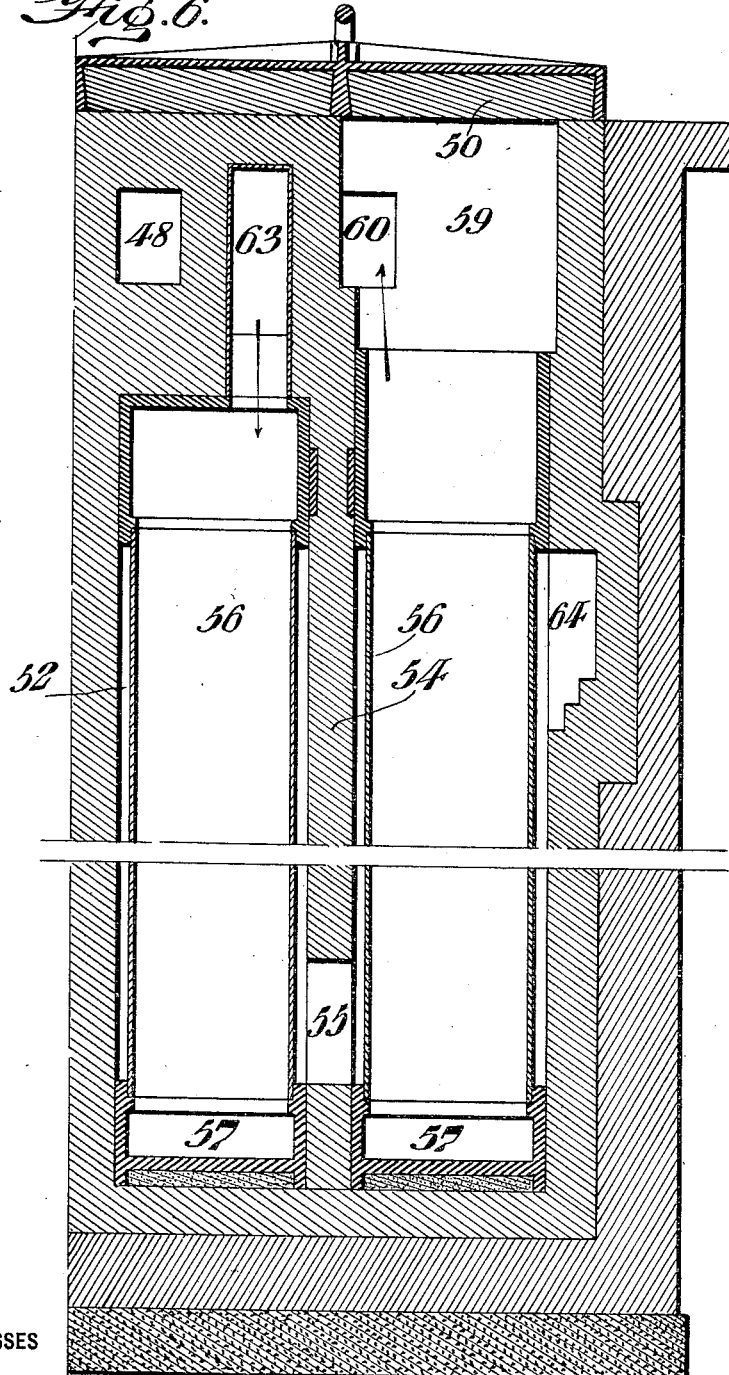

Figure 1 represents a vertical section of my improved furnace on the line $x$—$x$ in Figs. 2 and 3. Fig. 2 represents a top plan view of my improved furnace. Fig. 3 represents a horizontal section of the furnace on the line $y$—$y$ in Fig. 1. Fig. 4 represents a horizontal section of the furnace on the line $z$—$z$ in Fig. 1. Fig. 5 represents a transverse sectional view of one half of the preheating section of the furnace on the line $a$—$a$ in Fig. 3. Fig. 6 represents a transverse sectional view of one half of the preheating section of the furnace on the line $b$—$b$ in Fig. 3. Fig. 7 represents a sectional view of one of the twyers into which a liquid fuel burner opens into the combustion chamber, and a top view of one of the burners. Fig. 8 represents a sectional view of one of the crucible lifts. Fig. 9 represents a sectional view of one of the additional caps and covers for a crucible. Fig. 10 represents a side-view of as much of the main cover of the combustion chamber as is necessary to illustrate the application of the roller bearing lever for raising and revolving said cover. Fig. 11 represents a side-view in perspective of the lever for raising the lids to remove the crucibles.

Similar numerals of reference indicate corresponding parts in the figures.

Referring to the drawings, the numeral 1 indicates a suitable casing of sheet iron or steel, into which a pipe, 2, having a gate or valve $2^x$, opens from a suitable source of air under pressure. The upper end of the casing has a series of openings, 3, which communicate with a passage, 4, around the casing, and said passage communicates with a chamber, 5, formed between a sheet-metal jacket 6, and inner sheet-metal coverings $6^a$, and linings, $6^b$, of mineral wool, ashes or similar material, secured against the walls, 7, of the combustion chamber or crucible furnace 8. Said furnace has a slag-spout, 9, extending laterally from its bottom and temporarily closed during the operation of the furnace by a plug, 10, of fire-clay, graphite-paste or similar fireproof material. Twyers, 11, are provided through which the flames from suitable liquid fuel burners, 11$^x$, may be admitted into the furnace. The twyers have seats, 72, shaped as a segment of a sphere, into which correspondingly shaped heads, 73, are seated, being capable of rocking in all directions in said seats. Said heads have guide-rods, 74, secured in them, and the burners have longitudinally bored lateral extensions, 77, sliding upon said guide-rods and secured in their adjusted positions by set screws, 78. Nuts, 79, upon the ends of the guide-rods serve as stops for the outward movement of the burners. The ends, 80, of the burners are spherosegmental on the same radius as that of the heads.

The sphero-segmental heads may be rotated to adjust the jets of the burners to the most advantageous direction for the operation of the furnace. It has been found that where highest economy in fuel consumption is desired, such an adjustment is from time to time necessary as the furnace lining gradually burns out or slags off, whereby the original shape and size of the combustion chamber is changed, which also necessitates slight changes in the position of the geometrical axis of the jet or spray which enters the furnace. This most advantageous direction having been experimentally determined from time to time, the heads are securely fastened in said position by the clamp screws.

When the heads have been properly adjusted and secured by the clamps, the burners are slid inward upon the guide-rods until their ends have an airtight fit in the seats, whereupon they are secured by the setscrews. When the burners are not in operation, the set screws are loosened and the burners slid back upon the rods until stopped by the stop-nuts, when they may again be secured by the set-screws. By thus withdrawing the burners undue heating of the same by the heat from the furnace is avoided. Each twyer has a transverse guide-way in which a slide or gate, 76, may move to close or open the passage in the seat and through the twyer. The top of the furnace is open and is covered by a circular cover, 12, consisting of a metallic ring, 13, and a fireproof body, 14. Said cover has two diametrically opposite trunnions, 15, and stops, 16, are provided upon the top of the furnace, so that the cover may be rotated ninety degrees in either direction to bring either of the diametrically opposite holes, 17, in the cover to register with one of four crucibles, 18, in the furnace. Two forked lever heads, 19, have holes by means of which they may be fitted to rock upon the trunnions, and the two legs of each head have rollers, 20, which may travel upon the top of the furnace. Each head has a socket, 21, into which the end of a lever, 22, may be fitted. When it is desired to rotate the cover to bring one of the openings in register with a crucible, the levers are inserted into the sockets of the heads and rocked to bring a roller to bear against the top of the furnace, thus raising the cover, which may thus be rotated, traveling upon the rollers. The two openings in the cover are covered by circular lids, 23, of fire-proof material, and said lids have diametrical trunnions, 23$^x$, which may be engaged by the hooked ends of a forked lever, 24, having a fulcrum-lug, 25, which may engage in sockets, 26, in the top of the furnace. Each of the two lids may be lifted and swung out of the way from the opening by this lever so as to give access to a crucible beneath it. Each crucible rests upon a downwardly flaring cap, 27, preferably formed from the bottom of a worn-out crucible, and having a filling, 28, of graphite, which filling is formed with a diametrical groove, 29, engaged by a diametrical rib, 30, upon the upper end of a head, 31, of a plunger-tube, 32. Said tube has a tubular-jacket or covering, 33, of graphite or similar highly refractory material, and said covered tube slides in an opening, 34, of somewhat greater diameter, in the bottom of the furnace, surrounded by a boss, 35, which prevents any overflowing metal or slag from entering the bearing. A sleeve, 36, surrounds the lower end of the plunger-tube, adding weight to it and serving as a stop to prevent excessive upward movement. An upright tube, 37, is supported upon the bottom of the air-chamber and has a piston 38, upon its upper end, upon which the plunger-tube slides.

A pipe, 40, leads from a source of fluid under pressure and extends axially through the tube, opening through the piston, and fluid under pressure may be admitted through said pipe to raise the plunger-tube and the crucible thereon. A nipple, 41, extends from the lower end of the sleeve and has a chamber, 42, formed within it, having a valve-seat, 43, and a channel, 44, communicating through the sleeve and plunger within the latter and beneath the piston. A bushing, 45, upon the inner side of the plunger-tube forms a substantially airtight sliding joint between it and the piston-tube 37. A screw-valve, 46, is threaded through the outer end of the nipple, entering the chamber in the same and adapted to fit on the seat, and said valve has an axial bore, 47, opening through its side. The screw-valve may be adjusted in its relation to the seat to allow more or less air to enter or escape from beneath the piston during the descent or ascent of the plunger-tube, thus regulating the speed of the same by adjustment of the vent.

Two ducts, 48, lead from the furnace or combustion chamber to two crucible preheating ovens, 49, the open tops of which are closed by removable covers, 50, and said ducts convey the products of combustion and waste gases to said preheating ovens to heat charged crucibles, 51, before they are placed into the melting furnace. Beneath the crucible preheating ovens are pairs of chambers or stoves, 52, into which lead ducts, 53, from said latter ovens. The chambers of each pair are separated by a wall, 54, having openings, 55, near its foot, through which communication is provided between each pair of chambers. Flat air-flues, 56, rectangular in cross-section are arranged in the chambers and spaced so that the products of combustion may have access to all sides of said flues, and the upper and lower ends of each set of said flues are connected in pairs by means of coupling-boxes, 57, so that air entering the upper end of a flue at one end of a series will be conducted down and up through a series, emerging at the lower end of the last flue of the series and passes through a duct, 58, to the series in the adjoining chamber, where it passes through the flues in the same manner as in the first series, emerging at the upper end of the last flue into a chamber, 59, whence the hot air is conveyed by a duct, 60, to ducts, 61, in the walls of the combustion chamber. Each end of each of said ducts opens into the combustion chamber through an opening, 62, registering with a burner, so that the jet of the same is mixed with the hot air. The air for the preheating flues passes from the air-supply pipe 2, casing 1, passage 4 and the chamber 5 surrounding the combustion chamber, through ducts, 63 connecting with said chamber, to the first flue of each of the two series of air-flues, whereby the air-supply to the combustion chamber is preheated in the two air-preheating chambers or stoves. A flue, 64, conveys the products of combustion and waste gases from the two chambers.

The crucibles are of the ordinary shape employed in furnaces of this character, and are preferably made from graphite. Inasmuch, however, as a crucible packed with pieces of steel or other metal will not hold as much as the same size crucible will hold when the metal is melted, I provide a truncate conical extension, 65, also of graphite, which is filled with metal and preheated like the crucibles, finding room in the spaces between the latter in the preheating oven. To retain the pieces of metal in the extension, I provide a bottom, 66, and a top, 67, of iron or steel, connected by wires, 68. The upper end of the extension is closed by a domed cover, 69, which is also preferably filled with metal, and I form such cover with a hole, 70, in its top, for the insertion of a hook for removing the cover or of a rod to test the condition of the metal in the extension. The hole is preferably closed by a shard, 71, from a broken crucible.

When the charged crucible, extension and cover have been sufficiently preheated, they are removed from the preheating oven, put together, and placed upon the cap of a raised plunger cylinder which is thereupon lowered into the furnace and the opening closed by its lid. When the heat in the furnace melts the contents of the crucible, extension and cover, the metal bottom and top of the extension will also melt and allow the contents of the extension and cover to flow into the crucible, whereupon the cover may be removed by a hook inserted into the hole in the same and the extension may be removed by tongs and the top of the crucible covered by a cover, whereupon the crucible may remain in the furnace until the metal is properly melted. When this occurs, the crucible is raised by the lift after the cover has been rotated to bring an opening to register with it and after the lid has been removed. Very little heat will escape from the furnace while the crucible is removed, as the cap nearly fills the opening. A preheated crucible may now replace the one removed, and the process continued indefinitely. At times it may happen that slag or metal overflows the crucible and flows down to the face of the cap where it chills and cements the crucible to the cap. This seal may be broken by rotating the crucible by the tongs, as the cap is prevented from rotating by the tongue on the head of the plunger-cylinder engaging the groove in the filling of the cap.

By the employment of the fluid-actuated lifts, very little heat escapes from the furnace when removing a crucible, as the cap or crucible support nearly closes the opening in the cover. This is an item of great importance, as the escape of heat while removing a crucible from within the furnace by hand-adjusted tongs admits of a considerable escape of heat and consequent loss of heat in the furnace, which will require a proportionate consumption of fuel to restore. From practical tests and experience, I have found that the act of removing a crucible by manually adjusted tongs and lifting the crucible by a crane or similar hoist, occupies at least one-half minute, while in my furnace the crucible may be raised and the tongs of the traveling hoist adjusted in not more than five seconds. Consequently, the metal in the crucible will reach the molds at a higher temperature and in a more liquid condition. This is an important advantage as the amount of heat units emitted from a body in unit time is in direct proportion with the difference of the fourth powers of the temperature of the body and the surrounding medium. The unavoidable loss of heat which is very high at high temperatures can be cut down materially by shortening the total time of exposure of the hot body as much as possible and it is the object of this invention to provide means whereby said time of exposure of the interior of the furnace and of the crucibles is actually and considerably diminished in comparison with the heretofore usual practice. By tests with optical pyrometers, I have found that the reduction in temperature of a crucible heated to 2000° centigrade (the usual temperature in my furnace) during five seconds' exposure to the atmosphere amounts to 800° centigrade.

The openings in the furnace walls from the hot-air ducts in the same, and through which the jets of mixed oil and air are injected into the furnace are arranged near or in the corners of the same and open so that the flames assume a rotary or swirling motion, thereby producing uniform heating of the entire furnace. The jet of fuel from the twyer intersects the current of intensely heated air in the hot-air ducts 61 and is highly heated, vaporized and expanded, and completely mixes with the heated combustion air and this mixture is not ignited until the same has passed through the opening in the hot-air passage.

While the furnace is here disclosed as square in plan, the furnace may be constructed polygonal or round, when the twyers and burners will still be arranged so as to produce tangential flame jets creating the swirling flame motion, as will readily be understood without additional description and illustration.

As the walls of a furnace of this character quickly crack under the intense heat in the same, the air-chamber is formed by a completely closed casing, 6—6$^a$, so that none of the comparatively cold air in said chamber can enter the furnace and cool off the fire therein.

The plungers of the crucible lifts will be cooled in the base casing by the cold air entering the same, and the caps or crucible supports will be cooled by cold air ascending through the spaces between the openings 34 and the plungers and impinging against the under sides of the flaring rims of the caps.

The air entering the casing will be heated by contact with the bottom and sides of the furnace, in turn cooling said parts, and admission or entrance of air to the furnace is solely controlled by the valve or gate 2$^\times$ in the air supply pipe, as no access of air from the surrounding air-chamber can be had into the furnace through the sheet-metal sides of the same.

As the products of combustion leave the crucible preheating chamber and enter the top of one of the chambers of a stove, then pass down and enter the second chamber of the stove through the opening at the foot of the partition-wall and again pass upward to discharge into the stack, it is obvious that the greater part of the heat of such products will be given off to the air-flues in the preheating-stoves.

The air-flues in each of the preheating-stoves form a continuous tortuous passage, the receiving portion of which is in that portion of the stove where the products of combustion are discharging and are, consequently, least hot, while the discharging portion of the passage is in that portion of the stove where the products of combustion enter and are, consequently, the hottest. By this construction the intensely hot combustion air which produces the high-temperature combustion in the crucible furnace is attained and the process of melting highly refractory metals greatly accelerated. The air-flues, being flat in cross-section and extending vertically up and down in the stoves with spaces between them, will offer large heating surfaces to the products of combustion passing through the stoves.

The sphero-segmental shape of the heads of the burners and their seats in the twyers will form perfectly fitting closure at each twyer, so that no leakage of cold air will take place at the seats.

When the operation of the furnace is stopped, the gates are moved to close the twyer openings and the burners are withdrawn. When the gate in the cold-air supply pipe is closed, the furnace is completely shut off from inlet of cold air and will retain its heat, so that, if again started within reasonable time, it will not require as much reheating as if air had been freely admitted and it was necessary to heat the cold furnace.

The operation of this furnace is continuous when once started, and waste gases from the combustion chamber preheat the crucibles and the blast air, so that the best possible use is made of the heat generated in the combustion chamber.

While the furnace is illustrated and described as employing liquid fuel or gaseous fuel, it is evident that other forms of fuel may be employed. Also, while the furnace is disclosed as square or rectangular with square corners, it is evident that change may be made in the plan or shape of the furnace without change in its operation or advantages.

Other modes of applying the principle of my invention may be employed for the mode herein explained. Change may therefore be made as regards the mechanisms thus disclosed, provided the principles of construction set forth, respectively, in the following claims are employed.

Having thus described my invention, what I claim as new and desire to secure by Letters Patent, is:—

1. An apparatus of the character stated, comprising a single combustion-chamber and crucible melting furnace having a solid bottom, burners for gaseous fuel above said bottom, a crucible preheating oven, a flue directly connecting said furnace and oven to carry the products of combustion from the former to the latter, an air-preheating stove, a duct from the crucible-preheating oven to said stove, and an air-duct from said stove to the burners of the furnace.

2. An apparatus of the character stated, comprising a crucible furnace provided with burners, an air-chamber surrounding said furnace, means for supplying air under pressure to said chamber, a crucible preheating oven connected to said furnace to receive the products of combustion from the same, an air preheating stove connected to receive the products of combustion from said oven and having an air-flue, a passage from the air-chamber around the furnace to said air-flue, and a passage from said flue to the furnace.

3. In apparatus of the character stated, a crucible furnace having means for heating it, a plurality of individual fluid-pressure actuated lifts in the bottom of said furnace and upon each of which a crucible may rest and by which they may be raised and a plurality of removable lids in the top of said furnace and registering with said lifts.

4. In apparatus of the character stated, a crucible furnace having means for heating it, a plurality of fluid-pressure actuated lifts vertically movable in the bottom of the furnace and upon which the crucibles rest, a rotatable cover for the top of the furnace and having openings adapted to be brought to register with the crucibles and lifts, and removable lids for said openings.

5. In apparatus of the character stated, a crucible furnace having means for heating it, a vertical piston-tube beneath the bottom of the furnace and having a duct for the pressure fluid through it and a piston upon its upper end, a plunger-tube sliding upon said piston and having a bushing in its lower end sliding substantially airtight upon the piston-tube and a support for a crucible on its upper end, and an adjustable vent at the lower portion of said plunger tube.

6. In apparatus of the character stated, a crucible furnace having means for heating it and formed with an opening in its bottom surrounded by a boss, a piston rigidly supported beneath said opening, a plunger-tube sliding upon said piston and through said opening and having the portion sliding within the furnace covered by a jacket of refractory material, a head secured upon the upper end of said tube and formed with a diametrical rib on its upper face, a downwardly flaring crucible supporting cap having a filling formed with a diametrical groove fitting said rib, and means for admitting and exhausting pressure fluid between the piston and the head.

7. In apparatus of the character stated, a crucible furnace having means for heating it and formed with a slag-spout near its bottom and with an opening in its bottom surrounded by a boss, a plunger sliding in such opening and covered with a jacket of refractory material, means for raising and lowering said plunger, and a downwardly flaring crucible-supporting cap upon the upper end of the plunger.

8. Apparatus of the character stated, comprising a casing having means for admitting air under pressure into it, a crucible furnace above said casing and having means for heating it, an air-chamber surrounding said furnace and communicating with the interior of said casing, a preheating stove, a passage from the furnace to said stove, an air-heating flue in said preheating stove, and a passage from the air-chamber around the furnace to said flue.

9. In apparatus of the character stated, a crucible furnace having an opening in its top, a circular cover for said opening and formed with diametrically opposite trunnions and with diametrically opposite openings to register with the crucibles, stops upon the top of the furnace to engage the trunnions, and forked levers pivoted upon the trunnions and having rollers journaled in the ends of their limbs.

10. In apparatus of the character stated, a crucible furnace having an opening in its top and formed with sockets adjacent said opening, a circular cover for said opening and formed with diametrically opposite openings to register with the crucibles and provided with means for rotating it, lids for said openings and provided with trunnions, and a forked lever having hooks at the ends of its limbs to engage such trunnions and a fulcrum-lug adapted to engage the sockets in the top of the furnace.

11. Apparatus of the character stated, comprising a crucible furnace formed substantially square, and burners in the corners of said furnace and arranged to each direct its flame along the adjacent wall, whereby a circular or swirling motion of the flames and products of combustion is attained.

12. Apparatus of the character stated, comprising a crucible furnace having a substantially square plan, hot-air ducts having openings at the corners of said furnace to direct the blast from each opening along the adjacent wall of the furnace, means for supplying hot-air under pressure to said ducts, and burners discharging through the walls of the furnace and into said openings, whereby a rotary swirling motion is imparted to the flames within the furnace.

13. Apparatus of the character stated, comprising a crucible furnace provided with burners, an air-chamber surrounding the walls of said furnace, means for supplying air under pressure to said chamber, a crucible preheating chamber, a duct extending from the furnace to said chamber, an air preheating stove beneath said latter chamber, ducts extending from said former chamber to said stove, flat vertical air-flues arranged in series in said stove and having their lower and upper ends alternately connected, a duct extending from the chamber around the furnace to the receiving air-flue of the series, and a hot-air duct extending from the discharging air-flue of the series to the burner openings and twyers in the furnace.

14. An apparatus of the character stated, comprising a casing having means for admission of cold air, a furnace supported upon said casing and having its solid bottom forming the top of the same, and an air-chamber surrounding and airtightly inclosing the sides of said furnace and communicating with the interior of said casing, whereby the sides and bottom of the furnaces are cooled.

15. In apparatus of the character stated, a casing having means for admission of cold air, a furnace supported upon the top of said casing and formed with a guide-opening in its bottom, a lift-plunger movable in the casing and through said opening and forming an air-space between it and the opening, and a downwardly flaring crucible-supporting cap upon the upper end of such plunger, said cap being cooled by air from the casing passing through the air-space surrounding the plunger.

WILLIAM MELAS.

Witnesses:
WM. TECHER,
C. D. McVAY.

---

Copies of this patent may be obtained for five cents each, by addressing the "Commissioner of Patents, Washington, D. C."